Sept. 2, 1924.　　　　　　　　　　1,507,069
J. KLAILA
VEHICLE LOCK
Filed May 7, 1923
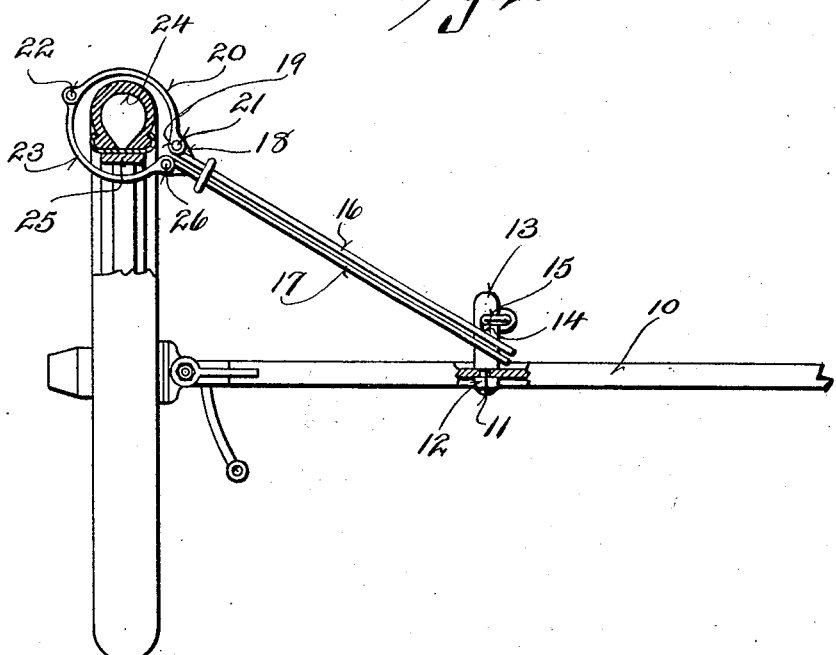
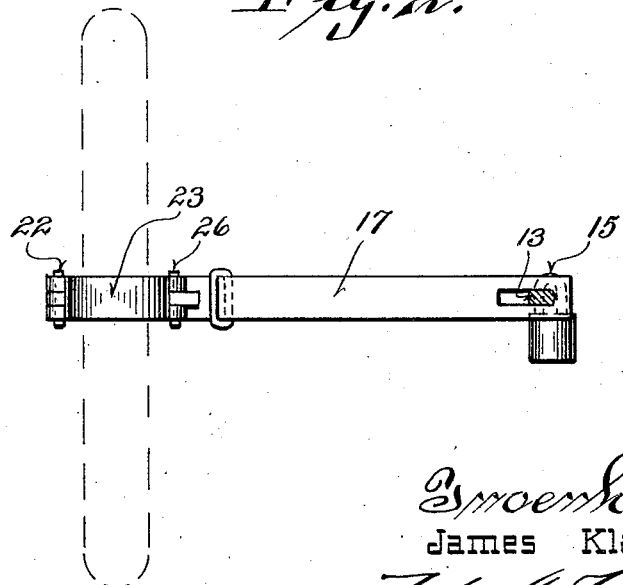
Inventor
James Klaila Patented Sept. 2, 1924.

1,507,069

UNITED STATES PATENT OFFICE.

JAMES KLAILA, OF RIO, WISCONSIN.

VEHICLE LOCK.

Application filed May 7, 1923. Serial No. 637,154.

*To all whom it may concern:*

Be it known that I, JAMES KLAILA, a citizen of the United States, and resident of Rio, in the county of Columbia and State of Wisconsin, have invented certain new and useful Improvements in Vehicle Locks; and I do hereby declare that the following is a full, clear, and exact description thereof.

The invention comprises a pair of semicircular straps hinged together, a link for each of the straps hinged thereto, the links extending to a pin secured to the front axle of a vehicle. The pin extends through adjacent openings in the links and a padlock prevents removal of the links. The semi-circular straps encircle the tire and felly of the wheel.

Hitherto it has been common practice to apply a shackle to a wheel, the shackle having an enlargement thereon adapted to contact with the ground and prevent rotation of the wheel. This device has the defect that it may be manipulated to dispose the enlargement sidewise; thus it is rendered ineffective.

It is the object of the invention to eliminate the defects of this construction and the other devices of the prior art, by the provision of means secured by a padlock to the front axle of a machine and extending therefrom to grip the wheel. The wheel is then not permitted to rotate, except for a very limited distance, with respect to the axle. The straps and links possess considerable strength and are secured to a pin extending through an opening in the axle and the parts are such as are difficult to break or render inoperative. As the wheel is not permitted to turn, it is substantially impossible to steal a machine equipped with the novel lock.

An object of the invention is the provision of a construction convenient in application and usage. The pin is readily installed in place, this necessitating merely the drilling of a hole through the axle for the reception of the pin and the links and straps may readily be placed in position, the hinges facilitating relative movement of parts. Similarly, also, the device may be readily removed.

With the above and other objects in view, which will appear as the description proceeds, the invention resides in the novel construction, combination and arrangement of parts substantially as hereinafter described and more particularly defined by the appended claims, it being understood that such changes in the precise embodiment of the herein disclosed invention may be made as come within the scope of the claims.

In the accompanying drawing is illustrated one complete example of the physical embodiment of the present invention constructed according to the best mode so far devised for the practical application of the principles thereof.

Figure 1 is a plan of the device as applied to a front axle and wheel, parts being shown in section.

Figure 2 is a sectional view, taken through the pin showing a link and straps in elevation.

A hole is drilled through the front axle 10 for the reception of the reduced end 11 of a bolt which is secured in position by nut 12, after which the extreme end of the bolt is flattened to prevent removal of the nut. The bolt is provided with an elongated head 13, having an opening 14 therein, through which the shackle 15 of a padlock is insertable. A pair of links 16 and 17 are provided with adjacent openings through which the pin is directed. Link 16 is provided at one end with a tongue 18 received in a knuckle 19 of a semi-circular strap 20, a pin 21 extending through the knuckle and tongue, forming a hinge. Strap 20 is hinged, also, at 22 to strap 23, the two straps forming a circle which envelops the tire 24 and felly 25 of the wheel. Strap 23 is again hinged at 26 to link 17. When the device is in locking position, it is impossible to turn the wheel, as this would necessitate tensioning the links 16 and 17 which are secured to the pin. It is, therefore, impossible to propel the vehicle over the ground. The machine cannot be moved until after the detachment of the padlock, which permits the links to be moved outwardly and the straps to be taken from the wheel. The device cannot possibly be manipulated in such wise that the car may be stolen without a key to the padlock. The wheel is locked against rotation. The straps, the links and the pin possess very considerable strength so that the starting of the motor of the car would be ineffective to break any of the portions of the securing device.

The manner of affixation of the pin to the axle is simple and the positioning of the straps and links in operable position is readily effected, the hinged relationship of parts facilitating this operation.

The head of the pin need not be rectangular in cross section but may be round to permit slight turning movement of links 16 and 17.

Attention is also directed to the fact that while I have shown a locking device secured to the axle, in some instances the same would be anchored to the spring, this modification in no way effecting the principle of operation.

I claim:

1. The combination of a pin secured to the front axle of an automobile, a link having an opening therein adjacent an end thereof, a second link having an opening therein adjacent the end thereof, said openings being adjacent each other, said pin extending through said opening, means securing the other ends of said links to the wheel and a padlock having the shackle thereof directed through an opening in said pin preventing removal of said links.

2. The combination of a pin secured to the front axle of an automobile, a link having an opening therein adjacent an end thereof, a second link having an opening therein adjacent the end thereof, said pin extending through said openings, a padlock having the shackle thereof extending through an opening in said pin preventing removal of said links, a strap hinged to said first-mentioned link, and a second strap hinged to said first-mentioned strap and the other end of said second link, said straps enveloping the felly and tire of a wheel.

In testimony that I claim the foregoing I have hereunto set my hand at Rio, in the county of Columbia, and State of Wisconsin.

JAMES KLAILA.